Patented Sept. 19, 1939

2,173,236

UNITED STATES PATENT OFFICE 2,173,236

HERBICIDE

Harold R. Offord, Berkeley, Calif., dedicated to the free use of the People of the United States No Drawing. Application November 26, 1937, Serial No. 176,652

2 Claims. (Cl. 167—45)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the Public in the territory of the United States of America to take effect upon the granting of a patent to me.

My invention relates to a new herbicidal formula for killing all manner of plants growing in promenades, alleys, public places, landing fields, along roads and railways, in forested areas, and specifically for the killing of currants, gooseberries, and barberry plants where they occur in wild or cultivated state.

Tests which have been carried out with my new herbicide have shown that the following plants have been killed:

(1) *Ribes petiolare* Dougl.—Western black currant.
(2) *Ribes inerme* Rydb.—White-stemmed gooseberry.
(3) *Ribes cereum* Dougl.—Squaw currant.
(4) *Ribes viscosissimum* Pursh.—Sticky currant.
(5) *Ribes roezli* Regel.—Sierra gooseberry.

The essential features of my invention consist in a herbicidal composition made by dissolving ammonium thiocyanate, $NH_4CNS$, (also called ammonium sulphocyanate) in the non-polar solvent furfural, $C_4H_3O.CHO$, and combining this solution with Diesel oil having specific gravity of 27° to 32° Baumé. This particular combination of chemicals is specifically designed for the eradication of all manner of plants growing in soils which contain too high a percentage of moisture to allow rapid penetration and maximum absorption of Diesel oil by the soil. The Diesel oil component is highly effective as a contact killer on the aerial plant parts and surface roots, while the ammonium thiocyanate and furfural will dissolve preferentially in soil water and move extensively through the wet soil. Ammonium thiocyanate is soluble in furfural to the extent of approximately 8.5 gms. per 100 cc. of technical furfural. The physical properties of the furfural-ammonium thiocyanate solution and the Diesel oil are such as to permit, upon agitation, a ready dissemination of the furfural in very fine droplets throughout the body of the oil.

Ammonium thiocyanate is not decomposed by furfural, and it may be dissolved in the furfural at any time prior to the addition of the Diesel oil. By way of illustration, I may use:

1 part by volume of furfural saturated with ammonium thiocyanate mixed with 1 to 20 parts by volume of Diesel oil.

My composition is prepared by saturating furfural with ammonium thiocyanate, preferably at room temperature, and adding the requisite volume of Diesel oil. It may be prepared in any type of metal container normally used for handling Diesel oil.

My herbicide combines the effectiveness of all three chemicals, and comparative tests have shown that the combination of Diesel oil, furfural and ammonium thiocyanate is more toxic than an equivalent weight or volume of pure Diesel oil, as more fully hereinafter shown. The Diesel oil and furfural are especially effective in penetrating protective tissues of the plant, while the ammonium thiocyanate moves rapidly and extensively through the vascular system of the plant. The Diesel oil acts as a convenient vehicle and spreader for the furfural and ammonium thiocyanate thus permitting a more economical use of the latter two compounds, which are somewhat too costly to use separately as weed killers.

My herbicide is relatively non-toxic to animals, and only slightly more corrosive to metals than the straight Diesel oil. No special precautions are required of the workmen who handle it other than the usual precautions taken in the handling of oils. The fire hazard of the mixture is substantially the same as pure Diesel oil. This means that no spontaneous combustion is liable to occur although the mixture can be ignited by means of a match or flaming brand.

My herbicide is applied as a spray to the aerial parts of the plants; as a combination aerial spray and soil drench to the plants; as a soil drench alone; or it may be applied directly to the cut-off crown of a plant, or to cut and scarified portions of a tree or other woody shrub.

My herbicide is equally effective in wet or dry soils. It is useful in areas where water is not available because all the weight transported can be considered as having potential weed-killing value; and it is more effective than pure Diesel oil for killing plants growing in damp locations.

The dosage of chemical to be applied varies for the plant and soil under consideration. For Ribes and barberry, broadcast application to intact or decapacitated bushes should be made at the rate of 3 to 10 gallons per square rod. For treating decapacitated crowns of Ribes or barberry, an average dosage of one fluid ounce of the mixture for each four square inches of crown or root surface is recommended.

Tests with Diesel oil at the dosage rate of 10 gallons per square rod were applied (a) as a soil drench alone, and (b) as a combination spray and soil drench. The combination of Diesel oil (five parts) plus furfural saturated with ammonium thiocyanate (one part) was applied to R. petiolare plants (a) as a soil drench, and (b) as a combination spray and soil drench. The dosage of the combination formula was equivalent in weight to the dosage of the pure Diesel oil. In other words, the total weight of the chemical used in the new formula was the same as that used in the straight oil treatment. The plants tested were vigorous five-year-old greenhouse-grown Ribes and each of the formulae was applied by each of the two methods to six plants of similar size and vigor; thus, a total of 24 plants was used. Results of the tests showed 100% kill for the combination spray and soil drench of Diesel oil, furfural and ammonium thiocyanate, and 83% bush kill for the straight soil drench. By comparison, the straight Diesel oil killed just two out of the six plants (33⅓% bush kill) by the spray and soil drench treatment, and none at all by the soil drench alone.

Observations of tests which have been carried on in the States of California, Idaho, Colorado and Wyoming, indicate further that my new formula is more toxic than pure Diesel oil.

Having thus described my invention, what I claim for Letters Patent is:

1. A herbicide comprising furfural that has been saturated with ammonium thiocyanate, and combined with Diesel oil.

2. A herbicide comprise one part by volume of technical furfural that has been saturated with a technical grade of ammonium thiocyanate, together with 1 to 20 parts by volume of Diesel oil, having a specific gravity of 27° to 32° Baumé.

HAROLD R. OFFORD.